Nov. 12, 1968  R. G. MAS  3,410,419
DEVICE FOR SECURING REMOTE-CONTROL MANIPULATORS AGAINST ROTATION
Filed April 5, 1966
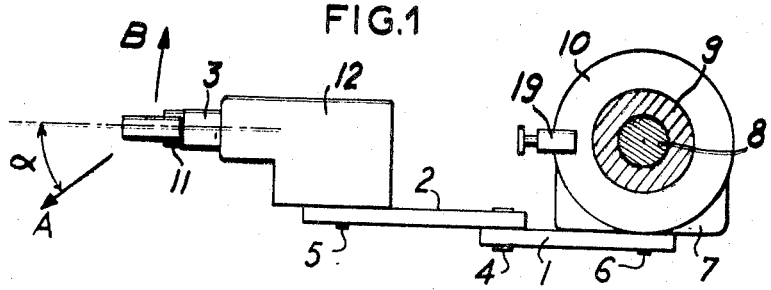
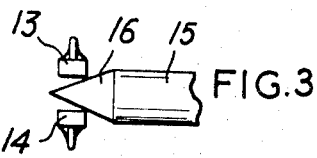
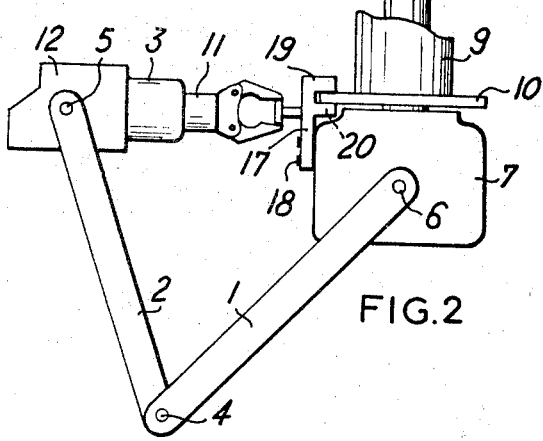
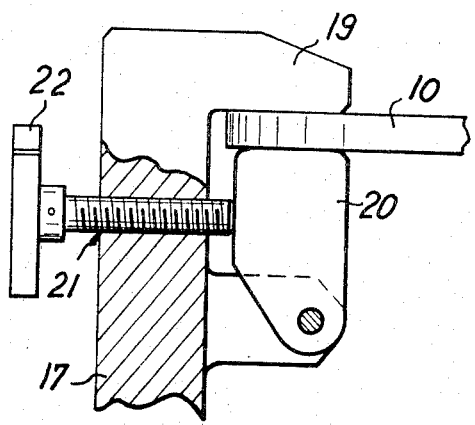

United States Patent Office 3,410,419
Patented Nov. 12, 1968

3,410,419
DEVICE FOR SECURING REMOTE-CONTROL
MANIPULATORS AGAINST ROTATION
Roland G. Mas, Aix-en-Provence, France, assignor to
Commissariat à l'Energie Atomique, Paris, France
Filed Apr. 5, 1966, Ser. No. 540,350
Claims priority, application France, Apr. 23, 1965,
14,488
2 Claims. (Cl. 214—1)

This invention relates to a device for securing remote-control manipulators against rotation, said device being actuated by the grab of a manipulator within a hot cell without any manul opertion being required.

In certain types of manipulator, especially those which comprise a friction clutch coupled with a driving motor for driving the manipulator arm in rotation, it usually proves difficult to exert a thrust on said arm in a direction which makes a given angle with a radial plane of displacement of said arm. In fact, such a thrust produces an oblique reaction on the arm, with the result that, as soon as the torque exceeds a certain value, the clutch tends to slip and thus causes the arm to pivot about its rotational axis.

The object of this invention is to circumvent the disadvantages noted above by virtue of an extremely simple device which permits self-locking of the arm itself so as to secure this latter against rotation and which consequently provides protection of the clutch unit and of the control motor.

This device is especially applicable to a remote-control manipulator which comprises on the one hand an arm, a fore arm and a wrist which are pivotally coupled with one degree of freedom in such a manner as to permit of their respective displacements in a same plane and especially in a vertical plane and, on the other hand, a grab which is mounted so as to be capable of rotation about the axis of the wrist and a control motor set housed in a casing which is integral with said arm so as to drive said arm in rotation about a shaft which is mounted within a cylindrical bushing provided with a stationary external annular flange, said device being characterized in that it comprises a clamp which is rigidly fixed to said casing and the jaws of which are brought into engagement with the stationary annular flange by immobilizing said arm with respect to said cylindrical bushing, the operation of said jaws being carried out by said grab in the folded position of the assembly consisting of arm, fore arm and wrist.

The complementary description which now follows below explains the manner in which the invention can be carried into practice, and accordingly relates to one example of construction which is given by way of indication and not in any limiting sense, reference being made to the accompanying drawings, in which:

FIGS. 1 and 2 are respectively a plan view and a view in elevation of a remote-control manipulator as provided with a locking device in accordance with the invention;

FIG. 3 illustrates a detail of FIG. 1;

FIG. 4 is a view on a larger scale and showing the locking unit proper or clamp.

As can be seen from the figures, the manipulator under consideration essentially consists of an arm 1, a fore arm 2 and a wrist 3, the fore arm 2 being pivotally coupled at one end to the arm and at the other end to the wrist by means of pivot pins such as the pins 4 and 5. That end of the arm 1 which is remote from the fore arm is pivoted by means of a pin 6 to a casing 7 which contains a driving motor and a friction clutch (these units have been omitted from the drawings) which serve to produce the rotational motion of the assembly consisting of arm, fore arm and wrist about a vertical shaft 8. Said shaft is fitted inside a cylindrical bushing 9 which can be telescopic and which terminates at the bottom in a stationary annular flange 10. In the example of construction under consideration, the arm 1, the fore arm 2 and the wrist 3 are permitted by the interaction of the different articulations 4, 5 and 6 to carry out a radial movement of displacement in a vertical plane which is consequently parallel to the axis of the shaft 8. There is mounted on the wrist 3 a handling grab 11 which can be endowed with a movement of rotation about the axis of the wrist under the driving action of a motor and clutch unit (not shown in the drawings) which are mounted inside a casing 12, said casing being integral with said wrist.

As shown in FIG. 3, if the claws 13 and 14 of the grab 11 are engaged over a part 15, the extremity 16 of which has a conical profile, the clamping effort exerted by the claws on said part therefore produces a reaction on the complete assembly of arm 1, fore arm 2 and wrist 3, and the resulting torque tends to cause the above-mentioned assembly to rotate about the shaft 8, thus producing slippage of the clutch of the motor which is contained in the casing 7.

Broadly speaking, as shown in FIG. 1, any thrust exerted by the manipulator in a direction which is inclined to the axis of the manipulator produces a torque which tends to initiate the pivotal motion of the apparatus, the movement of rotation of the cylindrical bushing being insufficient to prevent the clutch from slipping. The desired effort can in that case be obtained only as a result of a displacement of the manipulator as a whole. Under these conditions, the manipulator can be usefully employed only for the purpose of lifting and displacing loads. In FIG. 1, the direction of the effort to be exerted is represented by the arrow A, the torque being represented schematically by the angle $\alpha$ and by the arrow B.

In order to circumvent the disadvantage referred to, provision is made in accordance with the invention for a clamp 17 which is fitted on the casing 7 and rigidly fixed thereto by means of screws such as the screw 18. The jaws 19 and 20 of said clamp are intended to grip the stationary annular flange 10 so as to interlock the casing 7 and the stationary cylinder 9.

As shown in greater detail in FIG. 4, the jaws 19 and 20 of the clamp 17 are actuated by means of a set-screw 21, the head 22 of which is located in the vertical plane in which the radial movements of the arm take place. Under these conditions, the set-screw can readily be operated by the grab 11 of the remote manipulator itself which is accordingly moved into the position shown in FIG. 2.

In the example of construction considered, the set screw 21 accordingly produces a lateral displacement of the jaw 20 with respect to the jaw 19, with the result that the annular flange 10 is powerfully locked between said two jaws. As will appear self-evident, any suitable mechanical design could be adopted for the clamp 17 without thereby departing from the scope of the invention.

It should be noted that, when the jaws of the clamp are closed by the grab of the remote manipulator, neither the clamp 17 nor the set screw 21 is liable to be subjected to any abnormal stress. In fact, the clutch which is mounted within the casing 12 slips as soon as the maximum clamping force is attained and thus produces slippage of the grab 11 itself. Once this operation has been performed, the arm is again extended and returned to its initial position so as to exert the required effort on the object 15, rotational movement of the complete assembly being thus prevented.

As is readily apparent, the invention is not limited in any sense to the form of embodiment which has been described and illustrated and which has been given solely by way of example.

I claim:

1. Device for locking remote-control manipulators against rotation comprising an arm, a fore arm and a wrist pivotally coupled with one degree of freedom for respective displacements in the same vertical plane, a grab mounted for rotation about the axis of said wrist, a control motor in a casing, a pivot on said casing, said arm being pivotally mounted on said pivot, a shaft, said motor driving said arm in rotation about a cylindrical bushing mounting, said shaft being rotatably mounted in said bushing, a stationary external annular flange on said bushing, a clamp fixed to said casing, jaws for said clamp, said jaws gripping said stationary annular flange and preventing rotation of said arm around said cylindrical bushing, said jaws being capable of actuation by said grab.

2. Device as described in claim 1, said jaws being actuated by a set screw turned by said grab.

References Cited

UNITED STATES PATENTS

| | | | |
|---|---|---|---|
| 3,033,059 | 5/1962 | Melton | 214—1 X |
| 3,280,991 | 10/1966 | Melton | 214—1 |

GERALD M. FORLENZA, *Primary Examiner.*

GEORGE F. ABRAHAM, *Assistant Examiner.*